US011267206B2

(12) United States Patent
Mayes et al.

(10) Patent No.: US 11,267,206 B2
(45) Date of Patent: Mar. 8, 2022

(54) PROCESS FOR MANUFACTURING COMPOSITE PRODUCT

(71) Applicant: Stora Enso OYJ, Helsinki (FI)

(72) Inventors: Duncan Mayes, Helsinki (FI); Janne Pynnönen, Lempäälä (FI); Antti Korpela, Helsinki (FI)

(73) Assignee: Stora Enso OYJ, Helsinki (FI)

( * ) Notice: Subject to any disclaimer, the term of this patent is extended or adjusted under 35 U.S.C. 154(b) by 80 days.

(21) Appl. No.: 16/955,903

(22) PCT Filed: Dec. 12, 2018

(86) PCT No.: PCT/IB2018/060228
§ 371 (c)(1),
(2) Date: Jun. 19, 2020

(87) PCT Pub. No.: WO2019/123231
PCT Pub. Date: Jun. 27, 2019

(65) Prior Publication Data
US 2021/0016520 A1 Jan. 21, 2021

(30) Foreign Application Priority Data

Dec. 21, 2017 (SE) .................................. 1751603-0

(51) Int. Cl.
| | | |
|---|---|---|
| *B29C 70/12* | (2006.01) | |
| *B29C 48/285* | (2019.01) | |
| *B29C 48/92* | (2019.01) | |
| *B29C 48/94* | (2019.01) | |
| *B29C 48/29* | (2019.01) | |
| *B29C 48/91* | (2019.01) | |
| *B29B 7/00* | (2006.01) | |
| *B29B 7/92* | (2006.01) | |
| *C08J 5/04* | (2006.01) | |
| *C08K 5/00* | (2006.01) | |
| *C08K 5/092* | (2006.01) | |
| *B29K 105/12* | (2006.01) | |

(52) U.S. Cl.
CPC .............. *B29C 70/12* (2013.01); *B29B 7/007* (2013.01); *B29B 7/92* (2013.01); *B29C 48/2886* (2019.02); *B29C 48/29* (2019.02); *B29C 48/297* (2019.02); *B29C 48/91* (2019.02); *B29C 48/92* (2019.02); *B29C 48/94* (2019.02); *C08J 5/045* (2013.01); *C08K 5/0025* (2013.01); *C08K 5/092* (2013.01); *B29C 2948/92514* (2019.02); *B29C 2948/92704* (2019.02); *B29K 2105/12* (2013.01); *C08J 2323/12* (2013.01)

(58) Field of Classification Search
CPC ..... B29C 70/12; B29C 48/2886; B29C 48/92; B29C 48/297; B29C 48/94; B29C 48/29; B29C 48/91; B29C 44/505; B29C 44/507; B29C 48/0013; B29C 48/0014; B29B 7/007; B29B 7/92; C08J 5/045; C08K 5/0025; C08K 5/092
See application file for complete search history.

(56) References Cited

U.S. PATENT DOCUMENTS

2012/0065302 A1   3/2012   Weissenbach et al.

FOREIGN PATENT DOCUMENTS

| EP | 0679120 A1 | 11/1995 |
|---|---|---|
| EP | 2993203 A1 | 9/2016 |
| WO | 9411176 | 5/1994 |
| WO | 2008048878 A2 | 4/2008 |
| WO | 2015000363 A2 | 1/2015 |

OTHER PUBLICATIONS

Supplementary European Search Report from corresponding European U.S. Appl. No. 18/891,634, completed Jul. 20, 2021.
European Search Opinion from corresponding European application No. 188911634.
Bengtsson, Magnus et al., Extrusion and mechanical properties of highly filled cellulose fibre-polypropylene composites, Composites: Part A 38 (2007) 1922-1931.
Bengtsson, Magnus et al., Silane crosslinked wood plastic composites: Processing and properties, Composites Science and Technology 66 (2006) 2177-2186.
Magnus Bengtsson, et al., Profile Extrusion and Mechanical Properties of Crosslinked Wood-Thermoplastic Composites, Polymer Composites, 2006.

*Primary Examiner* — Stella K Yi
(74) *Attorney, Agent, or Firm* — Greer, Burns & Crain, Ltd.

(57) ABSTRACT

The present invention relates to an improved process for manufacturing an extruded composite product comprising natural fibers and a thermoplastic polymer. According to the present invention, mixing as well as crosslinking takes place inside an extruder. The natural fibers may be provided for example in the form of pulp or wood particles.

12 Claims, No Drawings

PROCESS FOR MANUFACTURING COMPOSITE PRODUCT

This application is a U.S. National Phase under 35 U.S.C. § 371 of International Application No. PCT/IB2018/060228, filed Dec. 18, 2018, which claims priority under 35 U.S.C. §§ 119 and 365 to Swedish Application No. 1751603-0, filed Dec. 21, 2017.

FIELD OF THE INVENTION

The present invention relates to an improved process for manufacturing an extruded composite product comprising natural fibers and a thermoplastic polymer. According to the present invention, mixing as well as reactive crosslinking takes place inside an extruder. The natural fibers may be provided for example in the form of pulp or wood particles.

BACKGROUND

In the field of extrusion and extrusion compounding of wood-polymer composite products, crosslinking between hydroxyl groups of the fibers is important to achieve desirable properties of the final product. At the same time, the manufacturing method needs to be efficient.

It is desirable to be able to manufacture composite products with a reduced amount of thermoplastic matrix, i.e. a product that contains as much natural fibers as possible. Generally, composite products become more brittle as the amount of thermoplastic matrix is reduced, said brittleness being a property which is typically undesirable.

For standard wood fiber polymer composites (WPC's), a common problem is moisture uptake and creep of the composite material. This problem often limits the use of standard wood fiber polymer composites in more detailed and challenging outdoor applications, such as in cladding, decking and joinery products. This problem also applies to injection moulded products that are exposed to challenging outdoor applications and humidity.

There is thus a need for more efficient processes for achieving composites having reduced moisture uptake, yet maintaining adequate mechanical properties of the composite product.

SUMMARY OF THE INVENTION

It has surprisingly been found that the method according to the present invention provides more efficient reactive crosslinking which leads to several advantageous properties of the extruded composite product, including high dimensional stability and stiffness, as well as reduced moisture uptake. The present invention also allows the use of high amounts of natural fibers, which is beneficial not only in terms of being a renewable material, but also facilitating recycling and contributing to a light-weight extruded composite product. In addition, it has been found that extruded composite products manufactured by the method according to the present invention exhibit surprisingly low creep compared to traditional wood-plastic composites. The extruded composite products obtained with the method according to the present invention also have a high biological durability.

Thus, the present invention is directed to a process for manufacturing an extruded composite product comprising the steps of a) introducing natural fibers and particles of a thermoplastic polymer and optionally 0.5-5 wt-% of coupling agent and optionally 0.5-4 wt-% of lubricant into an extruder, wherein the moisture content of the natural fibers and thermoplastic polymer particles introduced into the extruder is less than 1 wt-%; wherein the natural fibers have either been mixed with 1-20 wt-% of crosslinking agent prior to being introduced into the extruder or the crosslinking agent is introduced into the extruder via another inlet than the inlet through which the natural fibers and thermoplastic polymer particles are introduced, and wherein the temperature in the extruder at the point where the crosslinking agent is introduced is less than 150° C.;

b) if the coupling agent and lubricant was not introduced in step a), introducing 0.5-5 wt-% of coupling agent and optionally 0.5-4 wt-% of lubricant into the extruder via an inlet which is separate from where the natural fibers, thermoplastic polymer particles and optionally cross-linking agent is introduced into the extruder; mixing, the temperature in the extruder during mixing being at least 170° C. and wherein the pressure exerted on the introduced materials inside the extruder during mixing is at least 50 bar; and c) extruding a composite product through a die.

The composite product manufactured according to the present invention may for example be an extruded shaped product or be further processed into composite granules.

DETAILED DESCRIPTION

In step a) of the method according to the present invention, the natural fibers and the polymer particles are fed into an extruder. The natural fibers may be a mixture of different types of fibers and may for example be wood particles or pulp. Examples of pulp include mechanical pulp, semi-mechanical or chemical pulp, such as thermomechanical pulp, chemithermomechanical pulp or chemical pulp (manufactured in the kraft or sulfite process) or dissolving pulp. The wood particles may for example be ground wood, wood flour or sawdust. The natural fibers may be compacted prior to step a). The pulp may be processed or modified and the natural fibers may, at least partly, be provided in the form of microfibrillated cellulose. The moisture content of the natural fibers is less than 1 wt-%. To achieve that moisture content, the natural fibers are typically subjected to drying prior to step a). The extruder may be a single-screw or a twin-screw extruder. When the natural fibers are provided in the form of wood particles, said wood particles may be pretreated physically or chemically. For example, the wood particles may have been thermally modified or originate from thermally modified wood which has been subjected to grinding or by other means been processed mechanically to obtain wood particles. The wood particles may have been chemically modified. For example, the particles as such may have been chemically modified prior to step a) or the particles may originate from wood which has been chemically modified. The amount of natural fibers is about 45-90 wt-%, by weight of the extruded composite product, such as 55-90 wt-% or 60-90 wt-% or 60-80 wt-%. The thermoplastic polymer particles are for example polyethylene, polypropylene, styrene-based polymers such as SMA (styrene maleic anhydride) polymer or HIPS (high-impact strength polystyrene), copolymers or mixtures thereof. The amount of polymer particles is less than 50 wt-%, by weight of the extruded composite product, such as less than 40 wt-%, less than 35 wt-%, less than 30 wt-%, less than 25 wt-%, less than 20 wt-%, less than 15 wt-% or less than 10 wt-%. The thermoplastic polymer particles may for example be provided in the form of pellets or granules. The natural fibers are either mixed with the crosslinking agent prior to being introduced into the extruder or the crosslinking agent is introduced into the extruder through a separate hopper. When the natural fibers are mixed with the crosslinking agent prior to being introduced into the extruder, the mixing can be carried out for example by submersion of the fibers or by spraying onto the fibers, i.e. the crosslinking agent is provided in liquid form. Drying of the fiber prior that has been mixed with the crosslinking agent prior to introducing it into the extruder is typically carried out at a temperature of less than 120° C. The cross-linking agent may be for example citric acid, citric acid monohydrate and similar alpha hydroxy acids, or Fixapret (DMDHEU, i.e. dimethylol dihydroxyethyleneurea) or mDMDHEU, DHDMI (1,3-dimethyl-4,5-ihydroxy-2-imidazolidone, DMEU (dimethylol ethylene urea) polycarboxylic acid or a mixture thereof; optionally in combination with a catalyst. Preferably, the crosslinking agent is citric acid. The crosslinking agent may be provided in solid form, such as in the form of a powder or in liquid form in which case it may be applied by spraying or mixed in a mixing device. The amount of crosslinking agent used depends on the required level of reactive crosslinking between the hydroxyl groups in the natural fibers and the targeted strength requirements. Typically, the amount of crosslinking agent is 1-20 wt-%, by weight of the extruded composite product, such as 1-15 wt-% or 2-10 wt-%. At this stage of the process the components are only mixed but not reacted. The temperature in step a) is below the temperature required for a reaction to take place.

In step b) of the method according to the present invention, a grafted coupling agent of a thermoplastic polymer and maleic anhydride such as MAPP is introduced into the extruder, unless it was introduced in step a). The coupling agent enhances the interface between the natural fibers and the thermoplastic polymer. The amount of coupling agent used is typically 2-5 wt-%, by weight of the extruded composite product. In addition, a lubrication aid such as a wax or other lubricant typically used in the extrusion of wood-polymer composites is added, unless it was added in step a), to prevent sticking of the mixture and aid the flow in the extruder. The amount of wax or lubricant used is typically 0.5-4 wt-%, by weight of the extruded composite product. The coupling agent is added to create an interfacing link between the core extruded composite product and an outer layer or skin which may be applied to the extruded composite product after the method comprising the steps a) to c). Step b) is typically carried out at a temperature inside the extruder of at least 170° C. and a pressure of at least 50 bar.

In step c) of the method the composite product is extruded through a shaping die. The shaping die may also be referred to as a forming die or a profile die. The temperature during the shaping is typically at least 170° C. The extrusion taking place in step c) may be carried out in the same extruder used in step b) or in another extruder.

Steps b) and c) may either be carried out in the same extruder or step b) is carried out in one extruder and step c) is carried out in another extruder than step b). Thus, the material obtained in step b) may be extruded once or twice, or more than twice, i.e. pass through an extruder one time, two times or more than two times. Each extrusion may be carried out in the same extruder or in different extruders. When the coupling agent is introduced into the extruder in step a), it is preferred that the material obtained in step b) is extruded at least two times, i.e. that the material obtained in step b) passes through an extruder at least two times. The residence time of the introduced materials in the entire extrusion process is preferably between 1 minute and 20 minutes.

Thus, one aspect (referred to as method A below) of the present invention is a process for manufacturing an extruded composite product comprising the steps of a) introducing natural fibers and particles of a thermoplastic polymer into an extruder, wherein the moisture content of the natural fibers and thermoplastic polymer particles introduced into the extruder is less than 1 wt-%; wherein the natural fibers have either been mixed with 1-20 wt-% of crosslinking agent prior to being introduced into the extruder or the crosslinking agent is introduced into the extruder via another inlet than the inlet through which the natural fibers and thermoplastic polymer particles are introduced, and wherein the temperature in the extruder at the point where the crosslinking agent is introduced is less than 150° C.;

b) introducing 0.5-5 wt-% of coupling agent and optionally 0.5-4 wt-% of lubricant into the extruder via an inlet which is separate from where the natural fibers and thermoplastic polymer particles is introduced into the extruder; mixing, wherein the temperature in the extruder during mixing is at least 170° C. and wherein the pressure exerted on the introduced materials inside the extruder during mixing is at least 50 bar; and c) extruding a composite product through a die.

Thus, one aspect (referred to as method B below) of the present invention is a process for manufacturing an extruded composite product comprising the steps of a) introducing natural fibers and particles of a thermoplastic polymer and 0.5-5 wt-% of coupling agent and 0.5-4 wt-% of lubricant into an extruder, wherein the moisture content of the natural fibers and thermoplastic polymer particles introduced into the extruder is less than 1 wt-%; wherein the natural fibers have either been mixed with 1-20 wt-% of crosslinking agent prior to being introduced into the extruder or the crosslinking agent is introduced into the extruder via another inlet than the inlet through which the natural fibers and thermoplastic polymer particles are introduced, and wherein the temperature in the extruder at the point where the crosslinking agent is introduced is less than 150° C.;

b) mixing, wherein the temperature in the extruder during mixing is at least 170° C. and wherein the pressure exerted on the introduced materials inside the extruder during mixing is at least 50 bar; and c) extruding a composite product through a die.

The present invention is also directed to an extruded composite product obtainable by the method comprising the steps a) to c). The composite product manufactured according to the present invention may for example be an extruded shaped product, i.e. a product prepared by direct extrusion in step c) of the process according to the present invention or a product that can be further processed into composite granules. The composite granules can for example be used in injection moulding, extrusion or sheet forming.

The extruded composite product obtained using the method comprising steps a) to c) can, unless it is a composite granule, be provided with an additional outer layer (for example if the composite product is a profile) also referred to as skin, after step c). The outer layer typically comprises a thermoplastic polymer and may also comprise wood particles, in which case the outer layer is a composite. The outer layer may also contain pigments and other additives.

It may also be embossed or otherwise provided with a structured surface. The outer layer typically has a thickness of about 0.1-5 mm, such as 1-3 mm. The outer layer can be provided on the extruded composite product obtained in steps a) to c) using a side extruder.

The extruded composite can be used as a core layer for example for decking, cladding, flooring, window frame, siding or similar building components.

EXAMPLES

Example 1

Samples were prepared in accordance with method A and method B respectively (see above).

In the samples, the amount of natural fiber was 47.5 wt-%. The crosslinking agent used was citric acid, which was used in an amount of 2.5 wt-%. The thermoplastic polymer used was polypropylene, which was used in an amount of 45 wt-%. The coupling agent used was polypropylene-maleic anhydride, which was used in an amount of 3 wt-%. A lubricant (Structol) was used in an amount of 2 wt-%.

Reference samples were prepared wherein the crosslinking agent was omitted. In the reference samples, the amount of natural fiber was 50 wt-%. The thermoplastic polymer used was polypropylene, which was used in an amount of 45 wt-%. The coupling agent used was polypropylene-maleic anhydride, which was used in an amount of 3 wt-%. A lubricant (Structol) was used in an amount of 2 wt-%.

The natural fiber used was either present in the form of thermomechanical pulp (TMP), SW (softwood kraft pulp) or thermally modified sawdust (Thermo SD).

The following results were obtained, strength tests:

TMP

The addition of citric acid increased the strain at break by about 30% using method B, compared to the reference sample prepared according to method method B. The strain at break was measured according to standard methods.

SW (Softwood)

The addition of citric acid increased the Young's modulus by up to 10% in method B, compared to the reference sample prepared according to method method B. The Young's modulus was measured in GPa according to standard methods.

Thermally Modified Sawdust (Thermo SD)

The addition of citric acid increased the strain at break by about 30% using method A and about 30% using method B, compared to the reference sample prepared according to method A and method B respectively. The strain at break was measured according to standard methods.

In addition, the addition of citric acid increased the stress at break by about 15% using method A and about 10% using method B, compared to the reference sample prepared according to method A and method B respectively. The stress at break was measured in MPa according to standard methods.

In addition, the addition of citric acid increased impact strength by about 10% using method A and about 13% using method B, compared to the reference sample prepared according to method A and method B respectively. The impact strength was measured in kJ/m$^2$ according to standard methods.

Water Absorption

To determine the water absorption, samples were prepared as described above and stored under water for about 1300 hours at room temperature. The weight and area of each sample was determined before and after storing the sample under water. The increased weight and/or area of the samples after having been stored under water is used to determine the water absorption of the samples.

For the SW and TMP samples, it was found that addition of citric acid resulted in about 65-75% reduction in weight change and 65-75% reduction in area change. It was also found that extruding in accordance with method A and method B further improved reduction in weight change and area change, compared to standard extrusion methods.

For the samples using thermally modified sawdust, it was found that addition of citric acid resulted in about 20% reduction in weight change and 30-50% reduction in area change. It was also found that extruding in accordance with method A and method B further improved reduction in weight change and area change, compared to standard extrusion methods.

In view of the above detailed description of the present invention, other modifications and variations will become apparent to those skilled in the art.

However, it should be apparent that such other modifications and variations may be effected without departing from the spirit and scope of the invention.

The invention claimed is:

1. A process for manufacturing an extruded composite product comprising the steps of
    a) introducing natural fibers and particles of a thermoplastic polymer and optionally 0.5-5 wt-% of coupling agent and optionally 0.5-4 wt-% of lubricant into an extruder, wherein a moisture content of the natural fibers and thermoplastic polymer particles introduced into the extruder is less than 1 wt-%, and wherein the natural fibers have either been mixed with 1-20 wt-% of crosslinking agent prior to being introduced into the extruder or the crosslinking agent is introduced into the extruder via another inlet different than the inlet through which the natural fibers and thermoplastic polymer particles are introduced, and wherein a temperature in the extruder at the point where the crosslinking agent is introduced is less than 150° C.; and
    b) if the coupling agent and lubricant was not introduced in step a), introducing 0.5-5 wt-% of coupling agent and optionally 0.5-4 wt-% of lubricant into the extruder via an inlet which is different from where the natural fibers, thermoplastic particles and optionally crosslinking agent are introduced into the extruder and mixing, a temperature in the extruder during mixing being at least 170° C. and wherein a pressure exerted on the introduced materials inside the extruder during mixing is at least 50 bar; and
    c) extruding a composite product through a die.

2. The process according to claim 1, wherein the natural fibers are provided in the form of wood flour.

3. A process according to claim 2, wherein the wood flour has been thermally or chemically modified prior to step a).

4. The process according to claim 1, wherein the natural fibers are provided in the form of pulp.

5. The process according to claim 1, wherein the crosslinking agent is citric acid.

6. The process according to claim 1, wherein an amount of natural fibers is 45-90 wt-%, by weight of the extruded composite product.

7. The process according to claim 1, wherein an amount of polymer particles is less than 50 wt-%, by weight of the extruded composite product.

8. The process according to claim 7, wherein the amount of polymer particles is less than 30 wt-%, by weight of the extruded composite product.

9. The process according to claim 1, wherein the crosslinking agent is introduced into the extruder via another inlet different than the inlet through which the natural fibers and thermoplastic polymer particles are introduced, wherein the temperature in the extruder at the point where the crosslinking agent is introduced is less than 150° C.

10. An extruded composite product obtained by the process of claim 1.

11. The extruded composite product according to claim 10, wherein the composite product is further processed into a composite granule or extruded to sheets that may be thermoformed in a process, optionally with additional layers, such as packages, trays or other thermoformed items.

12. The extruded composite product according to claim 11, wherein the sheets are thermoformed with additional layers.

* * * * *